Figure 1:
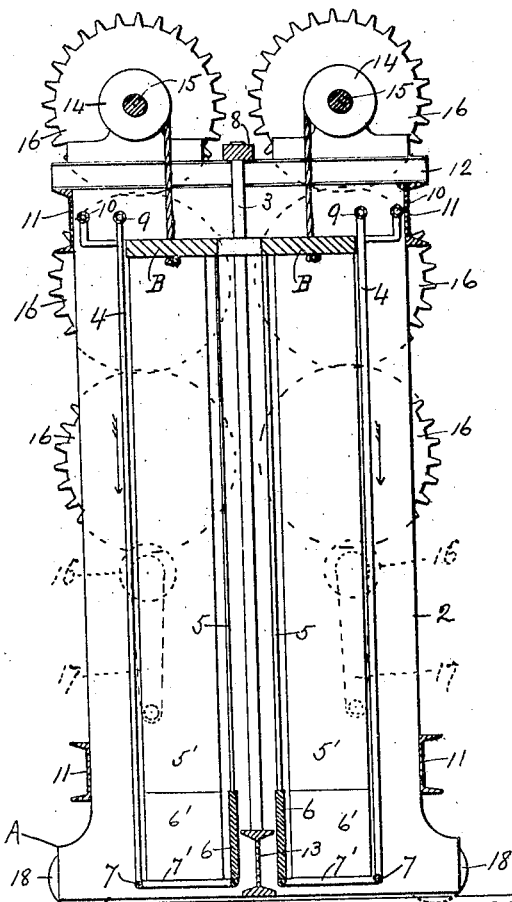

No. 892,223. PATENTED JUNE 30, 1908.
F. B. CLARK.
ICE CUTTING APPARATUS.
APPLICATION FILED MAY 20, 1905.

2 SHEETS—SHEET 1.

WITNESSES
Paul A. Blair
Walter Abbr

INVENTOR
Frederick B. Clark
BY
Howson and Howson
ATTORNEYS

No. 892,223. PATENTED JUNE 30, 1908.
F. B. CLARK.
ICE CUTTING APPARATUS.
APPLICATION FILED MAY 30, 1905.
2 SHEETS—SHEET 2.
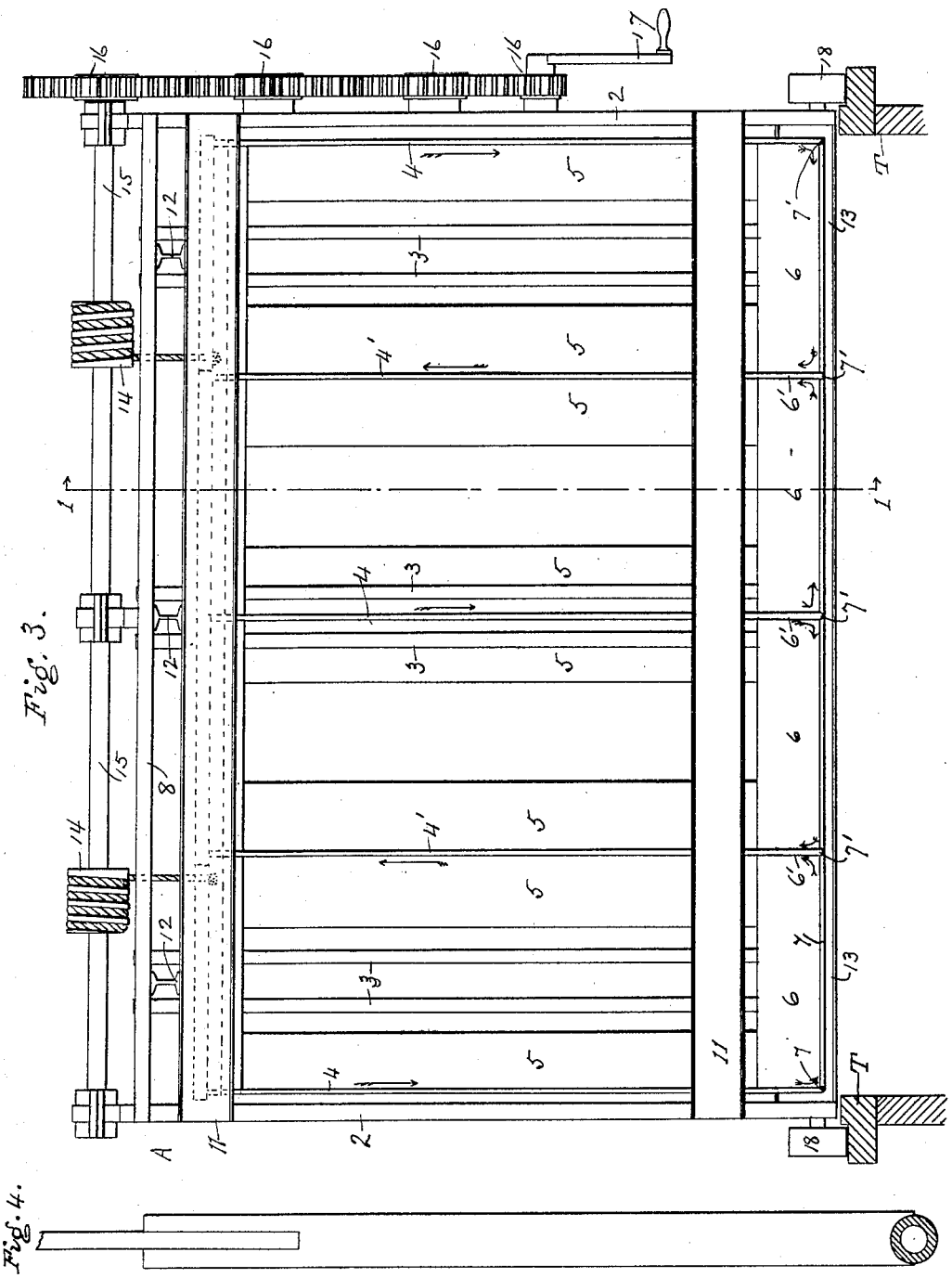
WITNESSES
Paul A Blair.
INVENTOR
Frederick B. Clark
BY
Howson and Howson
ATTORNEYS

UNITED STATES PATENT OFFICE.

FREDERICK B. CLARK, OF STAMFORD, CONNECTICUT, ASSIGNOR OF ONE-HALF TO THOMAS A. WESTON, OF STAMFORD, CONNECTICUT.

ICE-CUTTING APPARATUS.

No. 892,223.     Specification of Letters Patent.     Patented June 30, 1908.

Application filed May 20, 1905. Serial No. 261,443.

*To all whom it may concern:*

Be it known that I, FREDERICK B. CLARK, a citizen of the United States of America, and residing in Stamford, in the county of Fairfield, in the State of Connecticut, have invented an Improved Ice-Cutting Apparatus, of which the following is a specification.

My invention relates to that class of ice-cutting devices in which the cutting or penetrating action is a melting process due to heat supplied internally to the cutting member by a current of steam or other suitable heat conveying means.

The apparatus is particularly intended for use in plants for the artificial manufacture of ice by the ammonia or other process.

The object of my invention is to provide a more rapid, economical and effective ice-cutting device than heretofore known, whereby I not only save time and cost in the process of cutting, subdividing and removing the mass of ice formed in a freezing tank but in consequence of such increased speed of removal, or harvesting of the ice, I make it unnecessary by means of my invention, at any time to shut off the ammonia or the flow of brine to the freezing coils, whereby the normal effective freezing temperature is continually maintained and said freezing action is immediately resumed upon the removal of the block ice from the said coils, with the ensuing advantage of a corresponding increase in the total output or yield of block ice produced.

In former devices of this class the cutter performed its work or cutting function upon one side only of the vertical series of parallel members of a freezing coil at one and the same time or same cut, leaving the ice upon the other side of the said coil untouched; whereas by means of my invention of a two-part or duplex ice cutter, which straddles the coil operated upon, the block ice is cut simultaneously from both sides of the said coil at one downward movement thereof. The increased speed in cutting ice from the coils permits the latter to be kept uninterruptedly at their normal freezing temperature. The freezing or ice making periods are therefore lengthened, and the interruptions thereto made shorter by means of my invention. The cutting member in prior constructions has been provided with an internally heated tube, and with a suitable frame uniting all the parts, by the gravity of which cutter frame the heated cutting tubes are pressed downwards through the block ice. I provide a traveling frame to support the cutter frame to bring it into proper position over the different series of freezing coils in the tanks successively, to guide the cutter frame truly as it gravitates downwards through the ice on opposite sides of a freezing coil. I also provide the thus vertically guided cutter frame with hoisting means to raise it again, after it has performed its cutting function.

Figure 2:
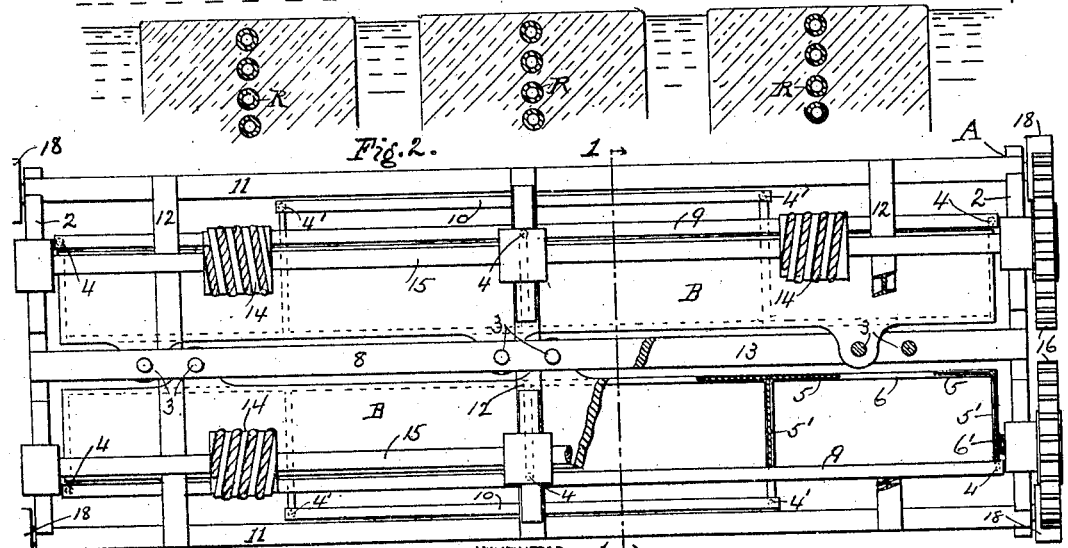

In the accompanying drawings Figure 1 is a vertical section through my improved apparatus on the line 1—1, Figs. 2 and 3; Fig. 2 is a plan view, with part broken away; Fig. 3 is a side elevation; and Fig. 4 is a view of a part of one of the cutters drawn to an enlarged scale.

As an example by way of illustration, I show my duplex cutter in the drawings, so constructed as to make five separate transverse cuts (Figs. 2 and 3) simultaneously upon each side of a freezing coil R (Fig. 1) whereby eight separate blocks of ice—four on each side of the coil—are embraced within the base of the cutter frame and cut free from the coil ready for removal. Of course any other number of blocks of ice may be separated from the coil simultaneously by an adequate increase in the length of the apparatus and in the number of the cutting members, or an apparatus can be made embracing a single ice block only, upon each side of the coil.

In the drawings the traveling frame or carriage A is shown as consisting mainly of two end plates 2 united by four longitudinal channel beams 11, the two upper ones of which are braced to each other by three transverse I-beams 12, while at the bottom the two end plates 2 are further united by the central I-beam 13. A tie bar 8 extends from end plate to end plate, into which bar are secured at their upper ends, the six vertical guide rods 3, their bottom ends being secured to the I-beam 13. The traveler also carries any convenient form of hoisting gear, whereby to lift the cutter frame or allow it to descend, as for example by the chain drums 14, the shaft 15, gears 16, and cranks 17. The carriage is shown as mounted upon rollers 18, so that it can be readily traversed longitudinally over the tank T containing the transverse freezing coils.

The duplex cutter frame consists mainly of the two longitudinal top plates B, B, perforated to embrace the six guide rods 3, which guide the cutter frame in its movement up or down. The top plates B are united to the backing plates 6 below, by twelve vertical strips of metal 5 and by ten transverse vertical strips 5¹. The pipe system whereby to convey steam to and from the tubes at the lower edges of the backing plates 6 and 6¹ consists of the two steam mains or headers 9 connecting with the six vertical supply pipes 4, these latter connecting with the eight longitudinal cutting tubes 7 and the ten transverse ones 7¹. The said edge tubes 7, 7¹ connect with the four up take exhaust pipes 4¹, these latter connecting with and discharging into the two exhaust mains 10. The steam reaches the tube system and is conducted from it through any ordinary or suitable flexible or jointed connections, which form no part of my present invention. The two members of my duplex cutter though acting together simultaneously upon the block ice on each side of the freezing coil R, which they straddle, are independent of each other as to their rate of descent when cutting, so that either member can lag behind or cut in advance of the other without one delaying or cramping the other as they descend through the block of ice. I prefer to make the heated tubes of less transverse thickness than the backing plates carrying them but this feature forms no part of my present invention.

I claim as my invention

1. In heated ice-cutting apparatus, the combination of a guiding frame with two heated tube cutting frames vertically guided thereon adapted to cut the ice simultaneously from opposite sides of a freezing coil.

2. In heated ice-cutting apparatus, the combination of a guiding frame with two heated tube cutting frames free to have independent vertical movement thereon and adapted to cut simultaneously the ice from opposite sides of a freezing coil.

3. The combination of a freezing tank, having a series of freezing coils with a traveling frame adapted to be traversed over the tank, two heated ice-cutters vertically guided on said frame and adapted to be lowered simultaneously over opposite sides of the freezing coils.

4. A freezing tank with transverse freezing coils in combination with a frame extending across the freezing tank and mounted to be traversed longitudinally over the tank, and cutters having guided and sliding vertical movement in the frame to cut cakes of ice from the coil, said cutters being provided with tubular penetrating edges, a steam feed pipe connected with one end of the tubular penetrating edges and an exhaust pipe connected with the other end of said tubular penetrating edges.

5. A freezing tank with transverse freezing coils, in combination with a frame extending across the tank and mounted on rollers to be traversed longitudinally over the tank, and two sets of heated cutters vertically guided in said frame to cut the ice simultaneously from opposite sides of each freezing coil.

6. In a machine for cutting plate ice, a frame, opposing independent cutters having sliding movement in the frame, a space intervening them, and means for raising the said cutters and permitting them to drop by gravity, whereby the said cutters are capable of simultaneous operation at each side of the freezing coil.

7. In a machine for cutting plate ice, a wheel-supported frame, cutters having guided vertical movement in the said frame, the said cutters being opposite one another, a space intervening them, tubular penetrating edges for the cutters, means for supplying steam to the said tubular penetrating edges, means for exhausting the steam therefrom, and devices for independently raising the cutters, permitting the cutters to drop by gravity during the operation of cutting, whereby the cutters are capable of operating simultaneously at each side of a freezing coil.

8. In an ice cutting machine, a support and a plurality of heated cutters having vertical and guided movement in the support and adapted to cut the ice simultaneously from opposite sides of a freezing coil.

9. In an ice cutting machine, a frame, a plurality of cutters having independent vertical and guided movement in the frame and each having a hollow penetrating edge, and means for admitting a heating medium to said penetrating edges.

In testimony whereof I have signed my name to this specification, in the presence of two subscribing witnesses.

FREDERICK B. CLARK.

Witnesses:
HARRY S. DE LAND,
L. D. RHINEHART.